Figure 1:
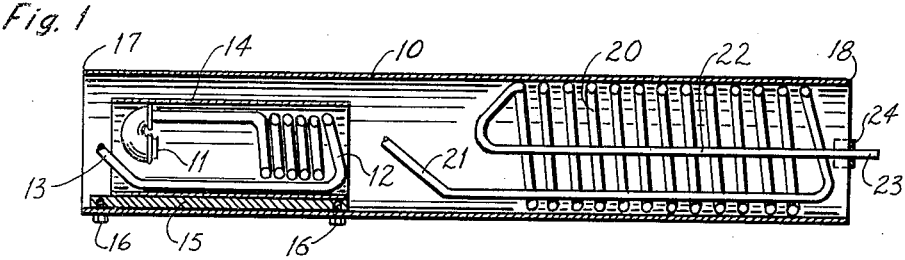

Sept. 25, 1962     H. D. JOHNSON ETAL     3,055,144
VAPORIZER FOR PREVENTING FROST DAMAGE TO AGRICULTURAL CROPS
Filed March 2, 1959     2 Sheets-Sheet 1

Harold D. Johnson
Robert W. Johnson
INVENTORS.

BY   H. T. Sperry
        ATTORNEY

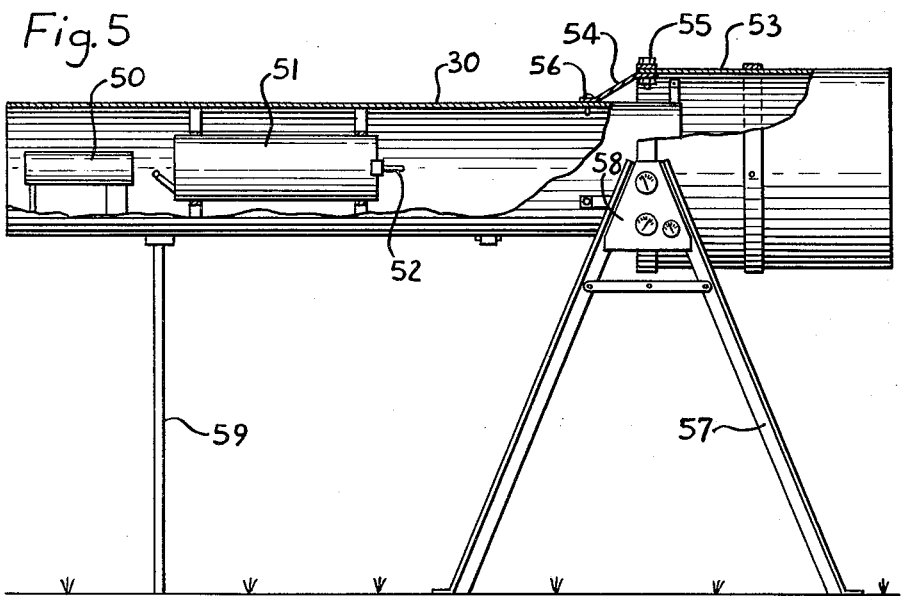
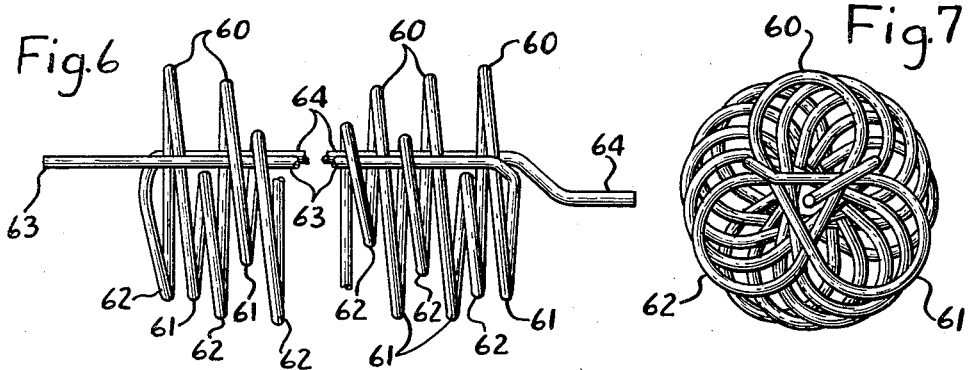
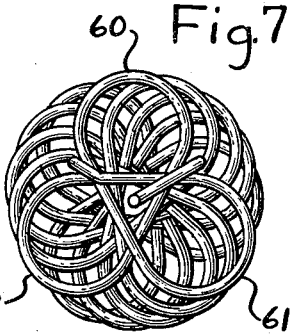
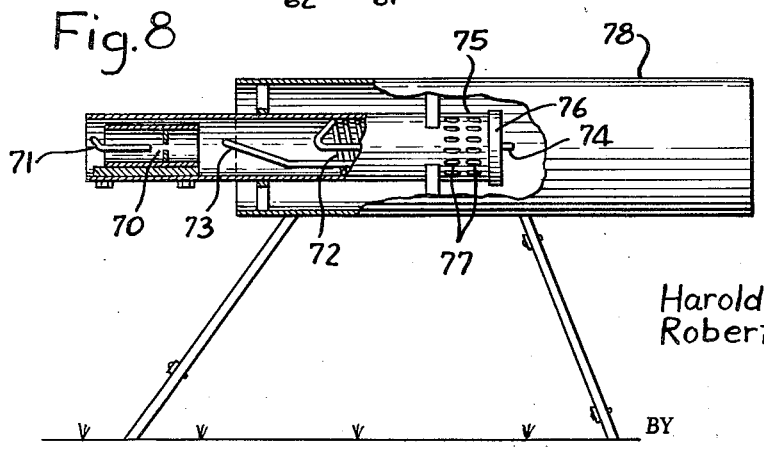
Harold D. Johnson
Robert W. Johnson
INVENTORS
BY A. T. Sperry
ATTORNEY United States Patent Office 3,055,144
Patented Sept. 25, 1962

3,055,144
VAPORIZER FOR PREVENTING FROST DAMAGE
TO AGRICULTURAL CROPS
Harold D. Johnson and Robert W. Johnson, Clearwater, Fla., assignors to General Implement Corporation, Clearwater, Fla., a corporation of Florida
Filed Mar. 2, 1959, Ser. No. 796,540
5 Claims. (Cl. 47—2)

In its broadest aspect, the present invention is concerned with affecting temperature and vapor conditions of gases. More particularly, the invention is concerned with the control of temperature and/or humidity of ambient atmospheric conditions. Throughout the present disclosure the terms humidity and moisture content are not used in a restricted way to refer merely to water or water vapor, but are used as a generic expression encompassing vaporized or condensed liquids, oils, alcohols, insecticide vehicles and the like, as well as water.

While the present inventive concept both as to apparatus and method, may be broadly applicable in affecting a wide variety of gaseous media, both as to temperature and moisture content, that form of the present invention here shown by way of example, is particularly adapted for the prevention of frost damage to agricultural crops, shrubbery, flowers, plants, vines, trees and the like. A careful study and analysis of frost damage has brought to light factors other than mere ambient atmospheric temperatures as affecting the degree of damage from frost. Investigations have brought to light two distinct phenomena contributing to a decrease of leaf temperatures to a point where damage sets in. One is by loss of heat through radiation from the leaf and the other is by evaporative cooling of the leaf. It has further been found that in both instances, the moisture content of the air is a major factor militating against the loss of heat by the leaf, independently of the ambient temperature of the surrounding atmosphere. Radiation may be rapid in dry air, thereby the heat of the ground or foliage is dissipated, however, a moist blanket of air will preclude rapid radiation. It has long been recognized that water vapor or condensed water droplets as well as $CO_2$ gas inhibits infrared radiation. Thus, in the presence of moisture laden air and/or the products of combustion from a burner, radiation heat losses may become negligible. Likewise, it is obvious that in the presence of moisture evaporation is minimized. Further, since the density of moist air, whether the moisture be in vapor form or in condensed droplets, is greater than dry air and hence, such moisture laden air tends to cling or settle downwardly and where such moist air is of a temperature higher than the ground or foliage, its heat may be transmitted to such ground or foliage. An important characteristic of the subjection of matter to water vapor laden air is the selective raising of the temperature of supercooled surfaces by the heat of condensation, an exothermic reaction taking place as the moisture vapor is condensed upon contact with such cooled surfaces. These factors indicate the desirability of preventing frost by the use of a warm moist air in contradistinction to frost prevention by conventional orchard type burner heaters. While such heaters may effectively increase ambient atmospheric temperatures, such increased temperatures are offset by the increased evaporative activity of air elevated in temperature by dry heat. Smoke and soot accompanying the burning as in fuel oils, wood, rubber and/or the like is not only obnoxious, injurious to health and cleanliness, but no inhibition to radiation is found to be provided, regardless of the low visibility which such smokes produce.

In general terms, that form of the invention here presented by way of illustration, may be broadly defined as including a burner, the products of combustion of which pass over a vapor generating coil from which a jet of vaporized liquid is discharged. In the direction of travel of the products of combustion there is discharged into the atmosphere, the vaporized liquid products of combustion together with air entrained by the jet of vaporized liquid and combustion to raise the ambient temperature and moisture content of the surorunding atmosphere. As a means of directing the discharged air, vapor and products of combustion, and for providing an aspirating effect, the burner and coil assembly are, in the present form of the invention, enclosed within a simple, open-ended, tubular combustion chamber. The inventive concept further embraces the provision of a coaxial outer casing of larger diameter than the combustion chamber, whereby additional air flow will be aspirated. Such outer casing also aids in directing the flow of the heated air, vapor and products of combustion and also provides a shielding for the combustion chamber so as to provide protection for those handling the device and/or closely adjacent foliage. In one form of the invention, a supplementary guide cylinder is applied about the casing at the discharge end and coaxially spaced therefrom to act as a third aspirating means and further means for guiding air flow.

In connection with the chamber and the auxiliary guide, it may be noted that the air velocity induced by such devices and the supplementary air drawn therethrough for contact with products of combustion is such as to reduce the temperature of the products of combustion to a point where there is no danger of secondary combustion where inflammable liquid is supplied through to the vaporizing coil which is formed by eccentrically arranged coil loops disposed in staggered relation axially of the coil in what may be termed cloverleaf pattern. By this means, a maximum coil surface is disposed in the path of the products of combustion from the burner. An important characteristic of the preferred coil of the present inventoin is the selection of tube length and diameter so that no restrictive orifice for the discharge jet is required. The length itself provides such fluid friction as to retain the liquid in the coil until fully vaporized.

Figure 2:
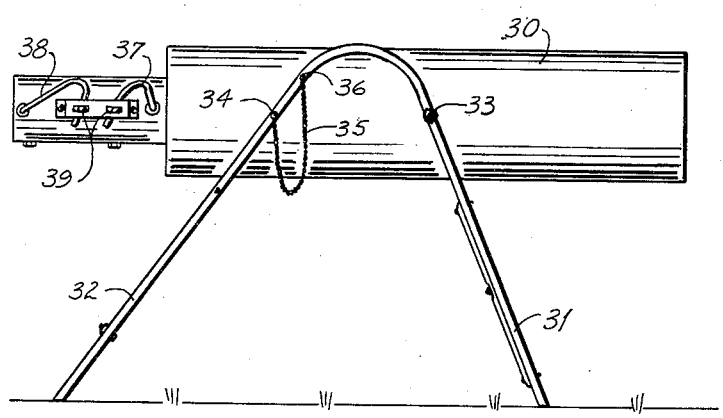
Figure 3:
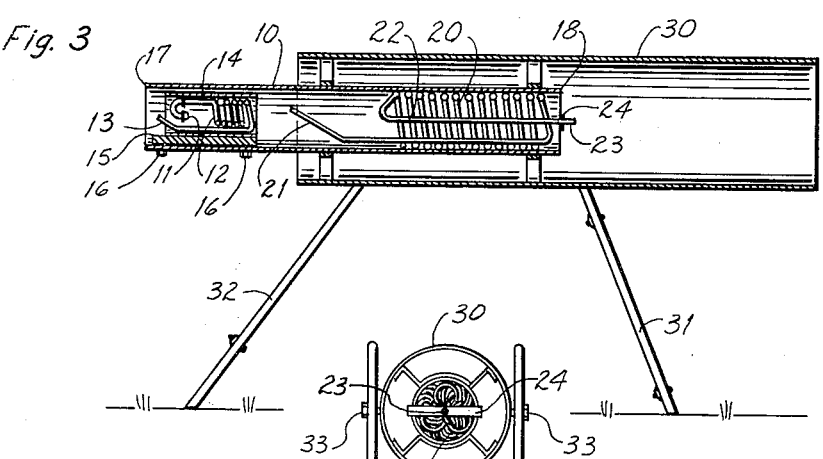
Figure 4:
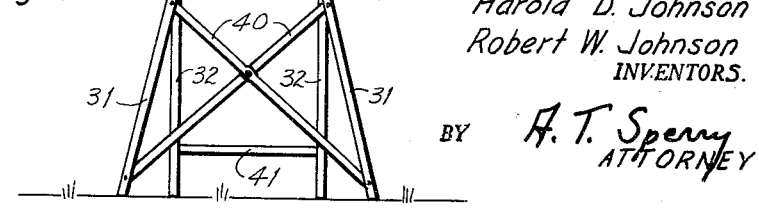

From the foregoing, it will be seen that it is among the objects of the present invention to provide a novel, simple and improved burned vaporizer unit for delivery of vapor and products of combustion to adjacent bodies of gaseous media. More specifically, it is among the objects of the invention to provide an air conditioner for developing a warm, moist air environment for the prevention of frost damage and to provide a method for preventing frost by the use of moisture laden air. Of course, other objects, features and advantages of the present invention will be apparent from a consideration of the following specification taken in conjunction with the accompanying drawings, in which:

FIGURE 1 is a side elevation of the burner generator combination forming a part of the present invention, FIGURE 2 is a side view of a frost prevention unit utilizating the burner generator combination of FIGURE 1, FIGURE 3 is a vertical section of the unit of FIGURE 2, FIGURE 4 is a front elevation of the unit of FIGURES 2 and 3, but with the coils of FIGURES 6 and 7, FIGURE 5 is a side elevation, partly in section, of a modified form of the frost prevention unit of the present invention, FIGURE 6 is a side elevation of a preferred vapor generator coil forming part of the present invention, FIGURE 7 is an end elevation of the coil of FIGURE 6, and FIGURE 8 is a side elevation, partly in section, of a further modified form of the invention.

FIGURE 1 is an illustration of one preferred form of the burner and vapor generator combination forming a part of the air aspirating and guiding tubes as shown in FIGURES 2, 3, 4, and 5. In FIGURE 1, the burner and vaporizer combination are illustrated as mounted within an open-ended cylindrical housing 10. The form of burner here disclosed by way of illustration is of generally conventional liquid fuel vaporizer type including a burner head 11, to which vaporized liquid fuel is delivered from a fuel vaporizer coil 12. The products of combustion of the burner 11 are directed toward the coil 12 to maintain vaporization of liquid fuel supplied from a fuel pipe 13 after ignition is once established by the application of external heat to the coil 12, initially vaporizing the fuel. The burner coil combination is here shown as housed within a cylindrical casing 14, mounted on a base 15, secured to the overall housing 10 as by bolts 16. It is to be understood that the invention is in no way limited nor confined to the burner fuel vaporizer construction here disclosed. Reference may be had to FIGURE 8 wherein the unit is disclosed as being provided with a Bunsen-type burner for the combustion of natural or artificial gas. Various other types of burners may be employed without departure from the spirit or scope of the invention.

The casing 14 is mounted longitudinally of the housing 10, preferably in substantially co-axial position and in such manner as to direct products of combustion forwardly from the rear open end 17 to the forward discharge end 18 of the housing 10. It will, of course, be understood that air to support the combustion is admitted through the rear open end of the casing 14, passing forwardly through the casing. Air is also admitted between the housing 10 and the casing 14, passing forwardly within the housing and being drawn into the housing by the aspirating effect of the products of combustion issuing from the forward end of casing 14. Within the forward portion of the housing 10, there is provided a vaporizing coil 20 to which liquid is supplied from the line 21. The coil is preferably arranged for counter-flow of the liquid to be vaporized, with respect to the flow of products of combustion from the burner unit. Such products of combustion fully vaporize the liquid admitted to the coil 20, the burner being so regulated and the construction of the coil being so designed as to insure complete vaporization. A feature of the invention is the use of a fully open coil of such length and diameter in relation to the heat applied as to utilize fluid friction to retain liquid in the coil until fully vaporized without requiring any restrictions or reduced orifice. From the coil 20, the fully vaporized liquid passes forwardly through a central tube 22 to be discharged as vapor at the vapor discharge nozzle 23, supported centrally of the housing 10 by a transverse bracket 24 and forwardly of the casing 14.

In operation, the coil 12 is brought to heat by the application of some form of external heating means until the coils reach the temperature effective to so vaporize fuel admitted to the fuel feed line 13 for discharge to the burner 11, at which the vaporized fuel is ignited with air entering the rear end of the burner casing 14. The products of combustion pass forwardly to the coil 20 and in emerging from the casing 14 into the housing 10, they have an aspirating effect, drawing air into the open end 17 of the housing 10 about the burner casing 14, the hot products of combustion striking tube 20, vaporizing liquid admitted thereto through the feed line 21. Such liquid in the tube is thus fully vaporized to be discharged as a jet from the vapor outlet tip 23 of the central discharge tube 20 to the coil. Such discharge of vapor with the products of combustion has a further aspirating affect insuring a continuous flow of air through the housing 10.

As indicated by FIGURES 2, 3, and 4, one of the more practical present uses contemplated by the present application for the burner vaporizer unit of FIGURE 1, is as a frost prevention device, wherein the burner combination of FIGURE 1 is inserted in a surrounding outer tube 30. As here shown, the burner vaporizer combination may be mounted at the rear end of the tube 30 to extend therefrom and being supported co-axially therein by suitable spiders. The tube 30 is preferably supported in horizontal position in spaced relation to the ground by support member including parallel spaced forward legs 31 and integrally formed rear supporting legs 32. The leg 31 pivotally engages the tube 30 through a bolt 33, while leg 32 is provided with a bolt 34, securing its chain 35, having a terminal pin 36, which may be engaged through the leg and into the tube 30 to provide for a tiltable adjustment of the tube 30.

In this form of the invention, the coil 20 is supplied with vaporized liquid through line 37, while the fuel line 38 provides liquid fuel for the coil 12. Lines 37 and 38 are preferably under the control of valves 39 located on the protruding side wall of the burner vaporizer unit. It will be noted that the burner vaporizer unit is mounted in the rearward end 17 of the tube 30 and protrudes therefrom. By so mounting the burner, it will be seen that an elongated passage for products of combustion and air is provided in the tube 30 forwardly of the burner vaporizer unit. The movement of the products of combustion and air, together with the forward flowing jet of vaporized liquid from the tip 23 provides a strong aspiration for bringing surrounding cool air inwardly through the rear end of the tube 30 and delivering it with substantial force and velocity, forwardly from the forward end of the tube 30. By this arrangement, a moist, warm blanket is provided for the protection of vegetation from frost in the manner referred to in the foregoing preamble. It will be understood that in most instances, water may be provided as the liquid for vaporization in the tube 20. As noted, the construction size of the coil 20 in relation to the burner is such as to insure complete vaporization of the liquid which issues into a vapor which may later be condensed into a cloud or mist of moisture droplets. After discharge, the heat of condensation is effective in further increasing the frost prevention by the warm, moist gases.

In a further form of the invention, particularly adapted for the discharge of warm moist air containing vaporized liquid which may be condensed to form a cloud of blanketing protective atmosphere for plants, a second and auxiliary guiding and aspirating tube is provided. This form of the invention is illustrated in FIGURE 5 in which the numeral 50 indicates the burner, while the numeral 51 indicates the vaporizing coil from which the vaporized liquid is discharged from the jet nozzle 52. The auxiliary, aspirating guiding tube or shell is indicated by the numeral 53 and is supported in co-axial spaced relation at the forward end of the tube 30 by circularly spaced supporting arms 54, secured by bolts 55 to the shell at 56. In this form of the invention, the forward portion of the device is supported on tripods 57 mounting a control and/or instrument panel 58. The rear end of the tube is supported by an upright 59. It will, of course, be understood that in general the operation of this form of the invention is as heretofore outlined with the exception that the additional shell 53 provides further aspiration of outer air and guidance of the discharge. In the operation of these devices, the aspiration of additional air either by the tube 30, or by the tube 30 in conjunction with the shell 53, is such as to induce an abundant supply of cool, fresh air for combining with the products of combustion and the jet of vapor. Where water is to provide the moisture there is, of course, no danger of secondary combustion. However, in some instances, it may be advisable to use oil or some equivalent form of combustible liquid for vaporization, in which instance, unless the vaporized material from the coil 20 is sufficiently cooled, together with the products of combustion, a secondary ignition might take place. The construction of the present invention is such as to provide for such velocity of discharge of vaporized material and/or such cooling of the material by the air aspirated through the tube 30 as to prevent danger of such secondary combustion.

While in FIGURES 1 and 3, the vapor generator coil 20 is for convenience, illustrated as a simple spiral coil of uniform diameter, the invention includes the specific type coil shown in detail in FIGURES 6 and 7 and indicated in FIGURE 4. This coil includes separate individual radially extended loops 60, 61 and 62 formed in a cloverleaf pattern radiating from a central inlet tube 63 extending concentrically of the total coil. In the formation of this coil, each successive group of loops 60, 61 and 62 are staggered as to their angular relation with each other in the transverse plane radiating from the liquid supply tube 63 and thus, the successive loops cover the entire transverse area of projection to provide a maximum surface for direct contact by the hot products of combustion. It will be seen that not only do the loops of the successive series provide maximum exposure, but since the loops are staggered, each successive loop is presented for direct contact with the products of combustion with no series of loops shadowing any adjacent loops with respect to the direction of flow of the products of combustion. As referred to before, the flow of liquid is preferably in counter-direction to the flow of products of combustion, the innermost terminal loop being connected by the tube 64 whereby the fully vaporized fluid passed forwardly through the discharge tube 64 is discharged as a jet. Again it is to be noted that the preferred coil provides such fluid friction in relation to length, diameter and heat applied as to insure full vaporization without recourse to restriction.

As hereinbefore referred to, the invention is not limited nor confined to the liquid fuel vaporizer type of burner shown in FIGURES 1 and 3. Thus, by reference to FIGURE 8, it will be seen that a gas burner of the Bunsen-type may be employed as illustrated at 70. Gaseous fuel is admitted to such burner through the gas line 71 and the products of combustion discharged from the burner pass through the coil 72 which is preferably of the type shown in FIGURES 6 and 7. The liquid to be vaporized is supplied to the coil 72 through the liquid supply line 73 and the fully vaporized material is discharged at the mouth 74. In this form of the invention, the front end of the tube 75 is closed by a cap 76, through which the discharge end of coil 72 passes. The products of combustion in this form of the invention are discharged from the tube 75 laterally through the aperture 77 to mingle with the incoming air aspirated through the tube 78 by the vapor jet. The products of combustion in this form of the invention, passing laterally into the stream of air, aspirated by the jets, will further assist in the aspiration of large quantities of the air to be warmed and moistened by their contact with the products of combustion and the vapor discharged.

Thus, it will be seen that the present invention provides a simple, novel, improved, effective and efficient burner vaporizer combination by which surrounding atmosphere is induced to flow through the unit providing ample supply of oxygen for combustion and for mingling with the products of combustion and the vapor by an aspirating effect. It will also be seen that the invention provides means for delivering hot, moist air with the products of combustion as well as the aspirated air to form a blanket of warm cloud for the protection of vegetation in the event of the threat of frost. It will be further seen that the invention provides a unique type of vaporizing coil providing a maximum of exposed coil surface to products of combustion and one which insures complete vaporization of liquid before discharge from the unit. It will also be noted from FIGURE 8 that the invention is not limited nor confined to any specific type of burner nor to the axial discharge of products of combustion from the burner vaporizing unit. In considering the invention, it will be understood that the invention is not limited nor confined to the specific structure of details herein shown and that many changes, modifications and the full use of equivalents may be resorted to without departure from the spirit or scope of the invention as set forth in the appended claims. While the device described above is particularly suited for use as a vaporizer for preventing frost damage to agricultural products, it will be understood by one skilled in the art that the use of the device is not limited and that it has other applications where large quantities of warm moist air are required.

What we claim is:

1. A vaporizer for preventing frost damage to agricultural products comprising, in combination, a tubular housing, a burner at one end of said housing so arranged that the products of combustion are directed axially through the housing toward the other end thereof, a vaporizer coil in said housing in the path of movement of the products of combustion, said vaporizer coil having an inlet connected to a source of vaporizable liquid and a discharge end directed axially of said housing for high velocity discharge of vapor therefrom, and an aspirating shell concentrically surrounding said housing and of tubular shape to define an annular space therebetween, said shell being axially extended beyond the said other end of the housing and beyond the discharge end of the coil so that relatively cool atmospheric air is aspirated through said annular space for intimate mixture with the vapor and products of combustion.

2. A vaporizer for preventing frost damage to agricultural products comprising, in combination, a tubular housing, a burner at one end of said housing so arranged that the products of combustion are directed axially through the housing toward the other end thereof, a vaporizer coil in said housing in the path of movement of the products of combustion, said vaporizer coil having an inlet connected to a source of vaporizable liquid and a discharge end directed axially of said housing for high velocity discharge of vapor therefrom, and aspirating means concentric with said housing and axially extended beyond the discharge end of the coil for drawing in relatively cool atmospheric air for intimate mixture with the vapor and products of combustion.

3. A vaporizer for preventing frost damage to agricultural products comprising, in combination, a tubular housing, a burner at one end of said housing so arranged that the products of combustion are directed axially through the housing toward the other end thereof, a vaporizer coil in said housing in the path of movement of the products of combustion, said vaporizer coil having an inlet connected to a source of vaporizable liquid and a discharge end directed axially of said housing for high velocity discharge of vapor therefrom, and an aspirating shell concentrically surrounding said housing and of tubular shape to define an annular space therebeween, said shell being axially extended beyond the said other end of the housing so that relatively cool atmospheric air is aspirated through said annular space for mixing with the vapor and products of combustion.

4. A vaporizer for preventing frost damage to agricultural products comprising, in combination, a tubular housing, a burner at one end of said housing so arranged that the products of combustion are directed axially through the housing toward the other end thereof, a vaporizer coil in said housing in the path of movement of the products of combustion, said vaporizer coil having an inlet connected to a source of vaporizable liquid and a discharge end directed axially of said housing for high velocity discharge of vapor therefrom, the said one end of the housing being open so that atmospheric air is drawn into said housing for mixture with the products of combustion, and auxiliary aspirating means adjacent the discharge end of the coil so that additional atmospheric air is aspirated for mixing with the vapor and products of combustion.

5. A vaporizer for preventing frost damage to agricultural products comprising, in combination, a tubular housing, a burner at one end of said housing so arranged that the products of combustion are directed axially through the housing, a vaporizer coil in said housing in the path of movement of the products of combustion, said vaporizer coil having an inlet connected to a source of vaporizable liquid and a discharge end directed axially of said housing, the vaporizer coil being of sufficient length and of constant small diameter all the way to the point of discharge so that the vapor forcibly discharged is fully vaporized, and aspirating means concentrically surrounding said housing adjacent the stream of vapor so that relatively cool atmospheric air is aspirated for mixing with the stream of vapor and the products of combustion.

References Cited in the file of this patent

UNITED STATES PATENTS

| | | |
|---|---|---|
| 666,685 | Neuendorff | Jan. 29, 1901 |
| 913,442 | Tilton | Feb. 23, 1909 |
| 1,006,534 | Clark | Oct. 24, 1911 |
| 1,135,368 | Filzer | Apr. 13, 1915 |
| 1,499,894 | Waterman | July 1, 1924 |
| 2,175,422 | Yoshinaka | Oct. 10, 1939 |
| 2,209,658 | Melhuish | July 30, 1940 |
| 2,223,597 | Brewster | Dec. 3, 1940 |
| 2,322,502 | Beckstrom | June 22, 1943 |
| 2,632,978 | Fetrow | Mar. 31, 1953 |
| 2,712,714 | McGee | July 12, 1955 |

FOREIGN PATENTS

| | | |
|---|---|---|
| 1,051,128 | France | Sept. 9, 1953 |
| 67,211 | France | June 3, 1957 |
| | (Addition to No. 1,051,128) | |